Oct. 11, 1966   W. P. BAZINET, JR   3,278,283

METHOD OF MAKING LIGHT-CONDUCTING OPTICAL COMPONENT

Filed April 12, 1963

INVENTOR
WILFRED P. BAZINET, JR.

BY
ATTORNEY 3,278,283
METHOD OF MAKING LIGHT-CONDUCTING
OPTICAL COMPONENT
Wilfred P. Bazinet, Jr., Webster, Mass., assignor to American Optical Company, Southbridge, Mass., a voluntary association of Massachusetts
Filed Apr. 12, 1963, Ser. No. 272,733
7 Claims. (Cl. 65—4)

This invention relates to light-conducting optical components, and more particularly to a method of making light-conducting optical components each comprising a glass core formed of a preselected type of glass having predetermined optical and physical characteristics surrounded by a cladding of glass formed of a different preselected type of glass having different predetermined optical and physical characteristics, said core and cladding being in such fused intimate optical contacting relation with each other as to provide a well defined optical interface therebetween for purposes to be presently described.

In the manufacture of elongated light-conducting optical components, particularly those intended for fiber optical light transmission and for laser light generation and amplification purposes and wherein the proper selection of special glasses having specific optical and physical characteristics is of utmost importance, it is often difficult or almost impossible to obtain glass rods and glass tubing of these particular glasses in sizes and cross-sectional dimensions desired. Also since the demand for such special glasses in rods and tubing of various sizes is limited, it would be economically unfeasible to attempt to make such rods and tubing by commercially available glass rod and tube drawing equipment.

More specifically, it has been found desirable in certain instances in the manufacture of laser-light generating and laser-light amplifying components, for example, to employ one kind of glass doped with a predetermined amount of active laser material as an elongated core arranged in combination with a cladding formed of a different kind of special glass doped with a predetermined amount of a different active laser material, and with these glasses fused together in good adjacent optical contacting relation so as to have a minimum of or substantially no bubbles, stones, stria or the like formed therebetween. Additionally, in the finished optical component the cross-sectional dimensions and thus the proportional amounts of the different glasses should be carefully controlled so that the best functioning of the components during use thereof can be obtained.

It has now been found that by practice of the present invention glass clad glass core optical components having the special optical and physical characteristics and dimensions desired can be readily, accurately and economically produced.

It is, accordingly, an object of the present invention to provide a method of making in an efficient, accurate and economical manner light-conducting optical components having cores and claddings formed of special glasses of preselected types and by which method a careful control of the related proportions of each type of glass to be embodied in the optical components can be accurately controlled. The invention also has the advantage of allowing glasses of different desired indices of refraction to be more easily chosen and makes it easier to choose mutually compatible glasses and glasses which have more nearly the same coefficients of thermal expansion.

Other objects and advantages of the present invention will become apparent from the detailed description which follows when taken in conjunction with the accompanying drawing in which.

In the manufacture of fiber optical light-conducting components and wherein these components have cores formed of high index glass surrounded by claddings formed of glass of lower refractive index, it is convenient to employ what may be termed a vacuum-type rod and tube drawing method and apparatus since components of good uniform optical quality and having fused-together interfaces can be produced thereby. Such a method is disclosed in the Hicks Patent 2,980,957 which issued April 25, 1961. However, when special glasses not readily available from commercial suppliers are to be used, as for example, in the manufacture of light-generating and light-amplifying laser components, whether same are to be of comparatively large cross-sectional dimensions or reduced down to smaller sizes or even to fiber sizes, it is preferable to follow the teaching of the present invention.

Figure 1:
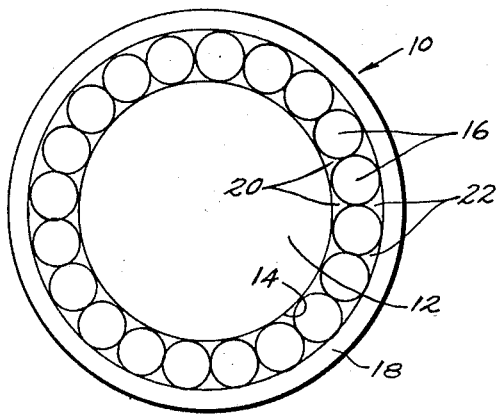
FIGURE 1 is an end view of an assembled arrangement of optical elements for use in practicing the method of the present invention.

In the practice of the method of the present invention, a first quantity of glass of a preselected type, and having the predetermined optical and physical characteristics desired in accordance with the particular use to which the finished component is to be put, is formed into an elongated rod or shaft of a cross-sectional size greater than that desired of this glass in the finished component, and this rod or shaft is provided with substantially parallel sides which have an optical finish thereon. In FIGURE 1, there is shown at 10 an assembled arrangement and this arrangement comprises such a finished rod or shaft 12 centrally located therein. This rod or shaft may be of any convenient length and would be provided with an optically finished outer surface 14.

A second quantity of glass of a different preselected type for forming a cladding, and likewise having predetermined optical and physical characteristics in accordance with the particular use to which the finished component is to be put, is formed into a second elongated rod or shaft of the cross-sectional size and shape desired and likewise having parallel sides and an optically finished outer surface. This second rod or shaft is then heated at one end to a softening temperature and drawn down into a smaller elongated rod, with the cross-sectional size of this smaller rod being controlled so as to have substantially a predetermined area relative to the cross-sectional area of said first rod or shaft 12. Of course, it will be appreciated that the larger the diameter of these smaller rods for forming the cladding when compared with the diameter of the rod 12 for forming the central core, the greater will be the percentage of the second type glass in the cladding relative to the first type glass in the core.

The smaller elongated rod is then cut so as to provide a plurality of similar shorter small rods which are placed, as shown at 16 in FIG. 1, about the periphery 14 of the rod 12. The assembly may then be placed in an outer parallel-sided tubular sheath 18 of glass which preferably would be only slightly larger in inside dimensions so as to receive the assemby, and its wall thickness would depend somewhat upon the character of the component being produced. For instance, if later on this glass of the sheath 18 is to be removed as by a grinding operation, it would be of advantage to use as thin a sheath as practical.

The sheathed assembly would then be placed in a drawing apparatus much like that disclosed in the above-mentioned Hicks patent, and with a suitable holder and source of vacuum connected to the upper end of the assembly. Thus, simultaneously with the heating of the lower end of the assembly, a suction can be applied to the upper end of the assembly for extracting all gases from the spaces within the assembly; such as indicated at 20 and 22 in FIGURE 1.

Figure 2:
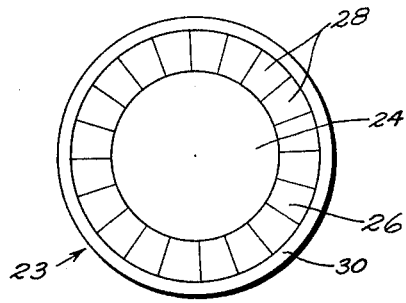
FIGURE 2 is an end view of an optical component resulting from practice of the improved method using the assembled arrangement of FIG. 1.

Accordingly, as the lower end of the assembled arrangement of FIGURE 1 softens, the suction will tend to collapse the glass or glasses of the parts 16 and 18 surrounding the core, and this would be more or less inwardly as a smaller rod or fiber is drawn down. The results will be that a composite rod or fiber have generally the cross-sectional appearance of that indicated in FIGURE 2 and with substantially no spaces remaining between the parts thereof will be produced. Thus, it can be seen that a composite rod 23 having a core 24 of the first type of glass will be formed and will be completely encased by a cladding 26 formed of the second type of glass in fused contacting relation therewith; said cladding being formed by a plurality of fused-together generally keystone-shaped segments 28.

Of course, the outer casing 30 which has resulted from the tubular sheath 18 collapsing about the assembly and being drawn down will be in fused relation with the cladding thus formed but in cases wherein same is not desired in the finished component, this casing may be ground away or otherwise removed.

While the use of the outer tubular sheath 18 is preferred in carrying the preferred method of the invention into effect, it is possible to merely enclose the upper end of the assembly of FIG. 1, minus the said sheath 18, in a clamping arrangement (not shown) but provided with a suction boot therearound so as to continuously draw a vacuum upon the upper end of the assembly during the heating and drawing down of a smaller composite rod or fiber from the lower end thereof.

Figure 3:
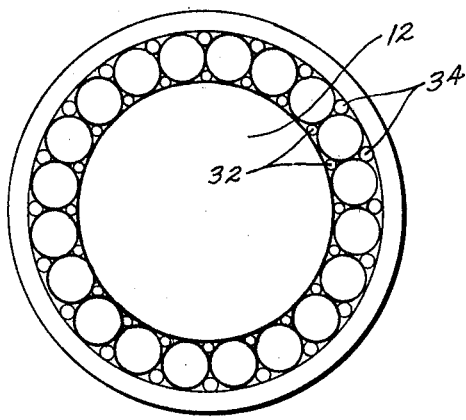
FIGURE 3 is an end view of a slightly different assembled arrangement of optical elements for use in practicing the method of the present invention.

In FIGURE 3 is shown an end view of a modified arrangement of parts much like that disclosed in FIGURE 1 but wherein the interstices or spaces 20 and 22 in FIGURE 1 have been at least partially filled by smaller rods 32 and 34. In such an arrangement, a lesser amount of vacuum-collapsing of the assembled parts will be required during the heating and drawing down of a smaller rod or fiber. These rods 32 and 34 can be of the same type of glass used to form the cladding, or if desired, might be of a different kind so as to provide different optical or physical characteristics as desired; such as a limited amount of absorption of certain wave lengths in the visible, infra-red or ultra-violet.

Figure 4:
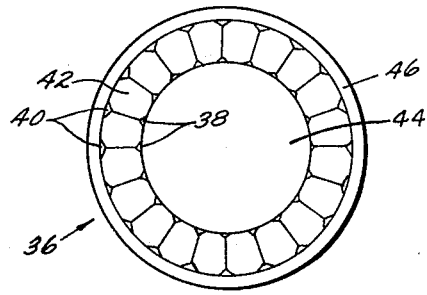
FIGURE 4 is an end view of an optical component resulting from the practice of the improved method using the arrangement shown in FIGURE 3.

The resulting composite rod or fiber is indicated generally at 36 in FIGURE 4 and shows the glass provided by rods 32 and 34 reshaped, as at 38 and 40, to fill the space between the cladding glass 42 and the central core 44 and between the cladding glass 42 and the outer sheath 46, respectively.

In some instances, it may be desirable to form the outer sheath 18, or 46, of glass which is opaque to visible light or to some predetermined wave length or wave lengths of optical radiation so that this sheath will serve as optical insulation for preventing the passage of such radiation therethrough.

Having described my invention, I claim:

1. The method of making a glass rod of one glass material having an optically effective glass cladding of another glass material, said method comprising the steps of arranging a plurality of rods of a first fusible glass material having selected optical properties and optically finished peripheral surfaces in a surrounding layer around another rod of a second fusible glass material having an optically finished peripheral surface and other optical properties in contacting, side-by-side, parallel relation to said other rod, heating one porton of said rods to a fusing and drawing temperature of the rod materials, and drawing out said rods at said heated portion to fuse said first glass rods into a solid integrated cladding of said first glass material fused in contacting relation to said other rod of said second glass material continuously around the periphery of said other rod.

2. The method of making a glass rod of one glass material having a relatively thin and optically effective cladding of another glass material, said method comprising the steps of arranging a plurality of rods of a first fusible glass material having a selected refractive index and optically finished peripheral surfaces in a relatively thin, surrounding layer around a larger rod of a second fusible glass material having an optically finished peripheral surface and a second refractive index in contacting, side-by-side, parallel relation to said larger rod, heating one portion of said rods to a fusing and drawing temperature of the rod materials, and drawing out said rods at said heated portion to proportionately reduce the cross-sectional areas of said rods and to fuse said first glass rods into a relatively thin, solid, integrated cladding of said first glass material fused in contacting relation to said larger rod of said second glass material continuously around the periphery of said larger rod.

3. The method as set forth in claim 2 wherein said plurality of rods are arranged in contacting relation to each other in said layer around said larger rod and wherein gases are evacuated from between said plurality of rods and said larger rod prior to said drawing of said rods.

4. The method of making a glass rod of one glass material having a relatively thin cladding of another glass material, said method comprising the steps of arranging a plurality of rods of a first fusible glass material in a relatively thin surrounding layer around a larger rod of a second fusible glass material in contacting, side-by-side parallel relation to said larger rod, inserting said rods within a tube of fusible glass material, heating a portion of said rods and tube to a fusing and drawing temperature of the rod and tube materials, and drawing out said rods and tube at said heated portion to proportionately reduce the cross-sectional areas of said rods and tube and to fuse said first glass rods into a relatively thin, solid, integrated cladding of said first glass material fused to said tube and fused in contacting relation to said larger rod of said second glass material continuously around the periphery of said larger rod.

5. The method as set forth in claim 4 wherein the periphery of said glass clad glass rod is subsequently abraded for removing substantially all of said tube material.

6. The method as set forth in claim 4 wherein gases are evacuated from within said tube prior to said drawing of said rods and tube.

7. The method of making a light-conducting glass rod of one glass material having a relatively thin glass cladding of another glass material, said method comprising the steps of arranging a plurality of rods of glass material of selected index of refraction, each having an optically finished peripheral surface, in a relatively thin surrounding layer around a larger rod of relatively higher index of refraction which also has an optically finished peripheral surface, said plurality of rods being arranged in contacting side-by-side parallel relation to said larger rod, heating one portion of said rods to a fusing and drawing temperature of the rod materials, and drawing out said rods at said heated portion to proportionately reduce the cross-sectional areas of said rods and to fuse said first glass rods into a solid integrated cladding of material of said selected index of refraction fused in contacting relation to said larger rod of said relatively higher index of refraction continuously around the periphery of said larger rod.

(References on following page)

References Cited by the Examiner

UNITED STATES PATENTS

| | | | |
|---|---|---|---|
| 1,751,584 | 3/1930 | Hansell | 65—4 X |
| 1,899,146 | 2/1933 | Gross. | |
| 1,926,552 | 9/1933 | Morgan. | |
| 2,608,722 | 9/1952 | Stuetzer. | |
| 2,752,731 | 7/1956 | Allosaar | 65—23 |
| 3,110,619 | 11/1963 | Koenig et al. | |
| 3,148,967 | 9/1964 | Hicks | 65—4 |
| 3,190,735 | 6/1965 | Kapany | 65—4 |
| 3,223,878 | 12/1965 | Todd. | |

DONALL H. SYLVESTER, *Primary Examiner.*

F. W. MIGA, *Assistant Examiner.*